June 13, 1950  H. W. TREVASKIS  2,511,384
CONTROL DEVICE FOR POWER OPERATED MEMBERS
Filed Aug. 31, 1948
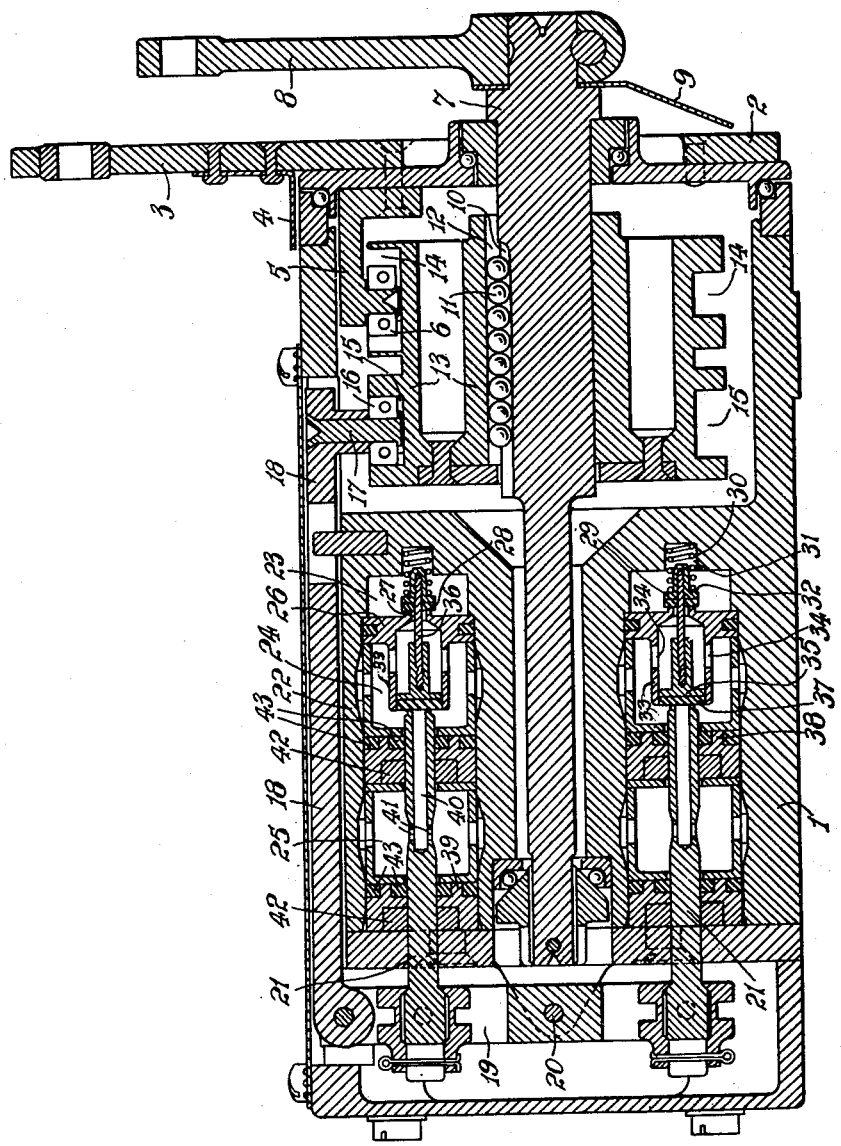
INVENTOR
Henry William Trevaskis
by Benj. T. Rauber
his attorney Patented June 13, 1950

2,511,384

UNITED STATES PATENT OFFICE 2,511,384

CONTROL DEVICE FOR POWER-OPERATED MEMBERS

Henry William Trevaskis, Solihull, England, assignor to Dunlop Rubber Company Limited, London, England, a British company Application August 31, 1948, Serial No. 47,096
In Great Britain September 9, 1947

6 Claims. (Cl. 121—41)

This invention is concerned with improvements in control devices for power operated members, particularly wing flaps and other aircraft control members.

It is an object of the present invention to provide an improved control device by means of which a wing flap or other power operated member may be caused to move automatically from one position to another predetermined position within the limits imposed by the stroke of the jack or other actuating device employed.

According to the present invention a control device for controlling the degree of movement of a power operated device associated with a fluid pressure actuating device comprises a housing a rotatable control member within the said housing rotatable under the control of the operator, means operable by the said rotatable control member for controlling fluid pressure to and from the actuating device, a rotatable follow-up member co-axial with the said rotatable control member operable by the movement of the said power operated device and means associated with the said rotatable follow-up member for automatically reversing the movement of the said control means for the fluid pressure when the said power-operated device has moved the desired amount.

The invention is particularly concerned with the provisions of a device suitable for controlling the degree and direction of movement of a member operated by a jack actuated by air pressure and will be more particularly described with reference to one embodiment suitable for controlling the degree of movement of the wing flaps of an aircraft.

In order that the invention may be more fully described, reference is made to the attached drawing, which is a sectional elevation of said embodiment.

The control device comprises a housing 1 provided on its exterior with an inlet nozzle adapted to be connected to a source of fluid pressure, two fluid pressure nozzles adapted to be connected to opposite ends of a double acting jack for operating in wing-flap, and an exhaust nozzle through which the used fluid passes when returned to the device from the jack.

One end of the body is closed by a rotatable plate 2 carried in ball bearings, to the ouside of which is rigidly attached a follow-up arm 3 and a pointer 4 movable over a scale on the body. A bracket 5 is secured to the interior of the plate and carries a selector roller 6, the axis of which is disposed radially of the axis of revolution of the plate.

A rotatable shaft 7 is mounted in ball bearings adjacent its one end in the rotatable plate 2 and co-axial therewith, said end projecting beyond the plate and being rigidly attached to a selector arm 8 and to a pointer 9 adapted to move over a scale on a circular portion of the follow-up arm. The shaft extends into the housing and at its end remote from the selector arm is supported in ball bearings located in the housing.

Inwards of the rotatable plate the shaft is formed with three axially directed grooves 10 equidistantly spaced around the periphery of the shaft. A set of balls 11 is housed within each groove and engage in similar grooves 12 in the interior of a cylindrical member 13 surrounding the shaft, whereby the shaft and member are precluded from relative rotation but the member is capable of limited axial movement with respect to the shaft.

The outer face of the cylindrical member is formed with two circumferential grooves, one functioning as a selector groove 14 and the other as an operating groove 15. The selector groove is adjacent the rotatable plate and comprises two portions which are axially offset with respect to each other and which are joined by axially inclined portions. It forms a track in which is located the roller 6 referred to above, and since the axial position of the roller is fixed, relative rotation of the roller and the cylindrical member 13 causes axial displacement of said member as the roller passes along either of the inclined portions of the track.

The operating groove 15, which is at the end of the cylindrical member remote from the rotatable plate, is a plain groove and forms a track for an operating roller 16 which is rotatably mounted on an arm 17 projecting at right angles from an operating rod 18, slidable axially within the housing, the axis of rotation of the roller being thus disposed radially of the axis of revolution of the plate.

The end of the rod remote from the roller is pivotally connected to one end of a rocking lever 19 rockable about a pin 20 extending diametrically of the housing. To each arm of the lever, at equal distances from the pin, is pivotally connected an exhaust plunger 21 forming part of a combined inlet and exhaust valve unit, of which there are two, one on each side of the rotatable shaft.

Each of the above valve units, which are identical in construction, comrises a body portion 22, divided in an axial direction into an inlet chamber 23 at the end adjacent the cylindrical member, a central operating chamber 24 and an exhaust chamber 25 at the opposite end. The inlet chambers and exhaust chambers of the two valves communicate respectively with the inlet and exhaust nozzles previously referred to, while each operating chamber communicates with one of the fluid pressure nozzles which lead to the operating cylinder of the wing jack.

The inlet chamber of each valve is separated from the adjacent operating chamber by a transverse wall 26 containing a central orifice for the passage of an operating rod 27 and provided with a seating 28 for an inlet valve 29 carried on the rod, said valve being urged against the seating by a compression spring 30 surrounding the end of the rod and located at one end in a cavity 31 in the end of the chamber and at the other end against an annular shoulder 32 formed on the face of the inlet valve remote from its seating.

Projecting into the operating chamber and spaced from the axially extending wall thereof is a sleeve-like extension 33 of the wall 26 separating the inlet and operating chambers, said extension being provided with a number of orifices 34 whereby free communications between its interior and exterior is established. The extension forms a guide for a piston like member 35 axially slidable therein provided with a piston rod 36 mechanically connected to the inlet valve operating rod and an exhaust valve seating 37 on the face remote from said rod.

Seated on said seating is the end of the exhaust plunger 21, which passes through fluid tight orifices in the wall 38 separating the operating and exhaust chambers and in the opposite wall 39 of the exhaust chamber and is pivotally connected to one arm of the rocking lever 19, as hereinbefore described. The plunger contains a central hole 40 extending axially from the end which contacts with the exhaust valve seating to the centre of the exhaust chamber, where it merges into radial holes 41, whereby the exhaust and operating chambers are placed in communication when the plunger is withdrawn from its seating.

In order that the exhaust plunger may move freely when actuated by the rocking lever while maintaining a fluid-tight seal, lubricating rings 42 and sealing rings 43 are located in annular grooves in the orifices in the transverse wall of the exhaust chamber, through which the plunger passes.

The operation of the device will now be described with reference to its use for varying the angle of an aircraft wing flap by means of a double-acting jack, in which case the selector arm 8 is coupled to the pilot's selector in the cockpit and the follow-up arm 3 to a flap lever or other suitable point so that its motion corresponds with that of the flap.

When the relative positions of the selector and follow-up arms are such that the selector roller 6 is midway between the ends of one of the inclined portions of its groove 14, the cylinder 13 will be at the midposition of its range of axial movement and the operating roller 16 and rod 18 in such an axial position that the exhaust 21 and inlet 65 valves 29 of both valve units are closed. The piston of the jack will then be stationary and the wing flap held in a predetermined position.

If it is desired to alter this position the selector arm 8 is rotated, the direction and degree of rotation being selected in accordance with the required direction and degree of movement of the flap. Rotation of the arm causes rotation of the cylinder 13 and as a result of the interaction between the selector roller 6 and the inclined portion of the groove 14 in which it is located an axial movement is imparted to the cylinder, which through the operating roller 16 and rod 18 opens the inlet valve 29 of one valve unit and the exhaust valve 21 of the other unit. The jack is thus operated to move the wing flap.

As the flap moves, however, this movement is communicated through the follow-up lever 3 to the selector roller 6, which moves in its groove 14 without causing movement of the cylinder 13 until it enters one of the inclined portions. As it travels along this portion, however, it causes axial movement of the cylinder, since its location in an axial direction is fixed by the bracket 5 to which it is attached. This movement of the cylinder 13 is communicated through the operating roller 16 and rod 18 to the valves, which gradually close until, when the selector roller 6 reaches the midway position in the inclined portion, both valves shut completely and the jack and flap remain stationary in their new position.

Though for the sake of clarity the above apparatus has been described with the arm 8 attached to the shaft 7 connected to the pilot's selector and the arm 3 attached to the rotatable plate 2 to the flap, it will be evident that the connections can, if desired, be reversed, since the operation of the device depends on the relative rotation of the shaft and the plate, and not on the order in which they move.

Having described my invention, what I claim is:

1. A fluid control device which comprises a rotatable transmission member slidable on its axis of rotation and having a cylindrical cam surface, a pair of actuating members rotatable relatively to each other on the axis of said transmission member, one of said actuating members slidably engaging said transmission member and the other actuating member engaging said cam surface to slide said transmission member axially upon rotation relative to said transmission member and said other actuating member, a pivoted lever connected to said transmission member to tilt in opposite directions upon the sliding of said transmission member in one direction or the reverse and a pair of valve units having valves connected to said lever on opposite sides of its pivot to move in opposite directions on the tilting of said lever.

2. The fluid control device of claim 1 in which each said valve unit comprises an inlet chamber, an operating chamber, an exhaust chamber, said operating chamber having an inlet port from said inlet chamber, a spring pressed inlet valve in said inlet chamber to close against said inlet port, an exhaust valve in said operating chamber connected to said inlet chamber and an exhaust plunger connected to said lever and extending through said exhaust chamber into said operating chamber and having an exhaust passage from said operating chamber to said exhaust chamber, said plunger being slidable to close said exhaust passage against said exhaust valve and to displace said inlet valve from said inlet port.

3. The fluid control device of claim 1 in which one of said actuating members comprises a rod extending axially within said transmission member, said operating member and said transmission member having opposed longitudinally extending grooves and balls between said grooves to hold said transmission member and actuating member in slidable engagement.

4. The fluid control device of claim 1 in which said transmission element is a hollow cylinder, in which one actuating member comprises a shaft extending co-axially in and slidably keyed to said transmission member and in which the other actuating member comprises a plate rotatable on said first actuating member and having an extension to engage the cam surface of said transmission member.

5. A fluid control device which comprises a pivoted lever, having arms on opposite sides of said pivot, means to tilt said lever, a pair of valve units, each unit comprising an operating chamber having an inlet port, an inlet valve outside said operating chamber spring pressed to close said inlet port, an exhaust valve in said operating chamber, and an exhaust plunger connected to one arm of said lever and extending into said operating chamber and having an exhaust passage from said operating chamber, said plunger being positioned to slide upon movement of said lever in one direction to close said passage against said exhaust valve and to displace said inlet valve from said inlet port.

6. The fluid control device of claim 5 in which said means to tilt said lever comprises a rotatable and slidable transmission member having a surface inclined to the direction of sliding, a connector slidable with said transmission member and connected to said lever to tilt said lever as said transmission member slides, an actuating member slidably keyed to said transmission member and rotatable therewith, and a second actuating member rotatable relatively to said transmission member and said first actuating member and engaging said inclined surface.

HENRY WILLIAM TREVASKIS.

REFERENCES CITED

The following references are of record in the file of this patent:

UNITED STATES PATENTS

| Number | Name | Date |
|---|---|---|
| 2,159,142 | Fisher | May 23, 1939 |
| 2,438,317 | Gabriel | Mar. 23, 1948 |
| 2,462,915 | Spielman | Mar. 1, 1949 |